United States Patent Office 2,904,543
Patented Sept. 15, 1959

2,904,543
ACID MONOAZO DYESTUFFS

Markus Kappeler, Basel, and Franz Frisch, Arlesheim, Switzerland, assignors to Sandoz A.G., Basel, Switzerland, a Swiss firm No Drawing. Application March 31, 1958
Serial No. 724,868

Claims priority, application Switzerland April 9, 1957

7 Claims. (Cl. 260—199)

This invention relates to acid monoazo dyestuffs of the general formula

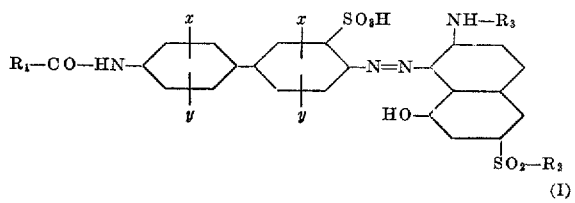
(I)

wherein $x$ and $y$ stand for hydrogen, halogen, or low molecular alkyl, alkoxy or alkylsulfonyl which may contain non-water-solubilizing substituents, $R_1$ stands for an alkyl, alkoxy, cycloalkyl, cycloalkoxy, aryl or heterocyclic radical which may be further substituted, $R_2$ stands for the hydroxy or amino group, the latter of which may be further substituted, and $R_3$ stands for hydrogen or a phenyl radical which contains at least one nonionic substituent in the ortho position.

Particularly valuable are the acid monoazo dyestuffs which correspond to the formula

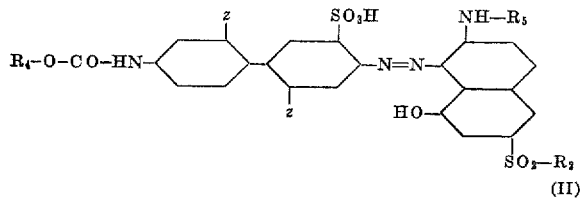
(II)

wherein $R_2$ has the above-named meaning, $z$ represents a chlorine atom or a methyl group, $R_4$ represents an alkyl radical containing at least 6 carbon atoms, an alkoxyethyl or a phenoxyethyl radical and $R_5$ represents a hydrogen atom, when $R_2$ is an amino group which may be substituted, and a hydrogen atom or a 2',6'-dimethyl- or a 2',4',6'-trimethylphenyl radical, when $R_2$ is a hydroxy group.

The process for the production of the new acid monoazo dyestuffs consists in coupling in acid medium 1 mol of the diazo compound of an amine of the general formula

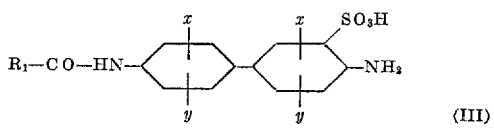
(III)

wherein $x$, $y$ and $R_1$ possess the above-cited meanings, with 1 mol of a coupling component of the general formula

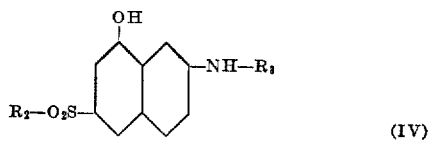
(IV)

wherein $R_2$ and $R_3$ possess the afore-cited meanings.

The new acid monoazo dyestuffs of Formula I possess good building-up properties on wool, silk, leather and polyamide fibers. From neutral to weakly acid baths they yield dyeings or printings with shades ranging from scarlet to red-violet. The brightest and most yellowish red shades are obtained with the 2-amino-8-hydroxynaphthalene-6-sulfonic acid itself and its amides, employed preferably in combination with the diazo components of Formula III which contain 2 methyl groups in the 2,2' positions of the diphenyl radical, these components being especially valuable for this purpose. Contrastingly, the monoazo dyestuffs of the 2-arylamino-8-hydroxynaphthalene-6-sulfonic acids coming with the scope of the invention yield bluish red to red-violet shades. The dyeings invariably possess very good fastness to light and good to very good fastness to acids, alkali, chlorine, stoving, crocking, carbonizing and dry cleaning. They are also dischargeable and reserve viscose filament yarn, acetate, triacetate and polyethylene terephthalate fibers. Their wet fastness properties (i.e. the fastnesses to water, sea-water, washing, alkaline milling and perspiration) are good to very good, provided the molecular weight of the dyestuff used is greater than 600. To obtain good wet fastness properties the 2-amino-8-hydroxynaphthalene-6-sulfonic acid, for example, must be coupled with a diazo component of Formula III containing a high molecular acyl radical. The higher molecular coupling components of Formula IV, in which the amino and/or sulfonic acid group is substituted, already yield monoazo dyestuffs of good to very good wet fastness on coupling with the simple acetyl derivatives of Formula III. As would be expected, those monoazo dyestuffs which contain a coupling component with a closed sulfonic acid group and thus have only the one solubilizing sulfonic acid group of the diazo component, show particularly good fastness to washing, perspiration and milling.

The amines of Formula III which are employed as starting materials in the present invention can be produced from the corresponding 4,4'-diamino-1,1'-diphenyl-compounds, for example 4,4'-diamino-1,1'-diphenyl-5-sulfonic acid, 4,4'-diamino-2,2'-dimethyl-1,1'-diphenyl-5-sulfonic acid, 4,4'-diamino-3,3'-dimethyl-1,1'-diphenyl-5-sulfonic acid, 4,4'-diamino-2,2'-dimethoxy-1,1'-diphenyl-5-sulfonic acid, 4,4'-diamino-2,2'-di-(trifluoromethyl)-1,1'-diphenyl-5-sulfonic acid, 4,4'-diamino-2,2'-di-(methylsulfonyl)-1,1'-diphenyl-5-sulfonic acid, 4,4'-diamino-3,3',6,6'-tetramethyl-1,1'-diphenyl-5-sulfonic acid or 4,4'-diamino-2,2'-dichloro-1,1'-diphenyl-5-sulfonic acid.

Acylating is carried out in the normal way by treating the aqueous solutions of the alkali metal salts of these diaminesulfonic acids with aliphatic, cycloaliphatic, araliphtic, aromatic or heterocyclic acid anhydrides or acid chlorides; normally only the free amino group which is not in ortho-position to the sulfonic acid group is acylated by the treatment. Besides acetic anhydride, propionic anhydride, etc., other examples of suitable acylating agents are the chlorides of acetic acid, chloroacetic acid, propionic acid, chloropropionic acid, butyric acid, valeric acid, caproic acid, caprylic acid, 2-ethyl-caproic acid, capric acid, lauric acid, palmitic acid, oleic acid, stearic acid, butylglycoloxyacetic acid, phenoxyacetic acid, the cresoxyacetic acids, benzoic acid, mono- and dichlorobenzoic acids, 4-tert.-butylbenzoic acid, phenylacetic acid, cyclohexane- or furancarboxylic acid. Particularly valuable as acylating agents are the chloroformic acid esters of various aliphatic, cycloaliphatic, araliphatic and heterocyclic-aliphatic alcohols, e.g. those of ethyl, 2-chloroethyl, butyl, hexyl, octyl, decyl, lauryl or cetyl alcohol, and the chloroformic acid benzyl, cyclohexyl, furfuryl, tetrahydrofurfuryl or morpholylethyl esters. Excellent alkylating agents are the chloroformic acid esters of certain ether alcohols, for example those of the ethylene glycol monoethyl, -butyl, -hexyl, -octyl or -phenyl ethers, and of the diethylene glycol monomethyl, -butyl or -phenyl esters.

Suitable coupling components of Formula IV as here defined are 2-amino-8-hydroxynaphthalene-6-sulfonic acid itself and its derivatives closed in the sulfonic acid group by an amide radical. The latter are obtained according to the known method by reacting 2-acetylamino-8-hydroxynaphthalene-6-sulfonic acid chloride with ammonia or a primary or secondary amine, with subsequent splitting off of the acetyl group, for example, the amide, methylamide, dimethylamide, β-hydroxyethylamide, di-(β-hydroxyethyl)-amide, morpholide, phenylamide, N-methyl-N-phenylamide, N-ethyl-N-phenylamide, N-β-hydroxyethyl-N-phenylamide of 2-amino-8-hydroxynaphthalene-6-sulfonic acid. Further suitable coupling components are the 2-phenylamino-8-hydroxynaphthalene-6-sulfonic acids with a phenyl radical substituted in the 2'-position, e.g. 2-(2'-methyl)-phenylamino-, 2-(2'-methoxy)-phenylamino-, 2-(2'-chloro)-phenylamino-, 2-(2',4'-dimethyl)-phenylamino-, or 2-(2',5'-dimethyl)-phenylamino-, but preferably the 2-(2',6'-dimethyl)-phenylamino and the 2-(2',4',6'-trimethyl)-phenylamino-8-hydroxynaphthalene-6-sulfonic acid.

The starting materials of Formula III used in the present process are indirectly diazotized. The diazo compounds are obtained in most cases as well crystallized precipitates of intense yellow or orange color: the yield is practically quantitative, so that they can be filtered off without loss. After filtering off and dispersing in water at 10–20° C. with a small addition of a mineral acid, the diazo compound is mixed with the acidified solution or suspension of the coupling component. Due to the high energy of coupling displayed by the diazo compounds used in the process, the reaction proceeds fairly rapidly even in presence of mineral acid and invariably in the 1 position of the azo component. Notably high coupling ability, even in mineral acid solution, is exhibited by the 2-phenylamino-8-hydroxynaphthalene-6-sulfonic acids used in the process. The coupling reaction can be accelerated by careful dropwise addition of a sodium acetate solution to effect partial neutralization of the mineral acid. On formation of the product, common salt may be added. The dyestuffs, which are well crystallized in some cases, are filtered off and dried.

An advantageous method of performing the process, above all in the production of monoazo dyestuffs closed with high molecular acyl radicals, is to use as starting materials the monoacetyl derivatives of Formula III, which are obtained in a yield almost equal to the theoretical yield. After diazotizing, the resultant diazo compounds are coupled with the coupling components of Formula IV. The acetyl group is eliminated by saponification and the free amino group is then closed with the higher molecular acyl radical by one of the known methods.

In the following examples the parts and percentages are by weight and the temperatures in degrees centigrade.

EXAMPLE 1

35.6 parts of the sodium salt of 2,2'-dimethyl-4-amino-4'-acetylamino-1,1'-diphenyl-5-sulfonic acid and 7 parts of sodium nitrite are dissolved in 300 parts of water. The solution is run slowly into a mixture of 30 parts of concentrated hydrochloric acid and 100 parts of water with ice added to maintain the diazotizing temperature at 5–10°. The diazo compound is precipitated as yellow crystals, filtered off and dispersed in 100 parts of ice-water with stirring. The diazo suspension is mixed with 32.8 parts of 2-amino-8-hydroxynaphthalene-6-sulfonic acid-N-methyl-N-phenylamide dissolved in 400 parts of water and 10 parts of concentrated hydrochloric acid. By rapid cooling the hydrochloride is partially re-precipitated in finely divided form. Coupling is initiated immediately and is completed in the space of 4 to 5 hours by the dropwise addition of a solution of 30 parts of crystallized sodium acetate. On completion of coupling the monoazo dyestuff, already largely precipitated, is completely precipitated by an addition of common salt and is subsequently filtered off. The precipitate is freed from the adhering mother liquor by washing with a 2% common salt solution. The dried dyestuff is a red powder which dissolves in warm water to give a bright red solution, and in concentrated sulfuric acid a violent solution. It dyes wool, silk, leather and polyamide fibers from weakly acetic acid baths in full red shades of very good fastness to light, washing, perspiration and milling.

EXAMPLE 2

47.6 parts of 2,2'-dimethyl-4-amino-4'-carbodecyloxyamino-1,1'-diphenyl-5-sulfonic acid of the formula

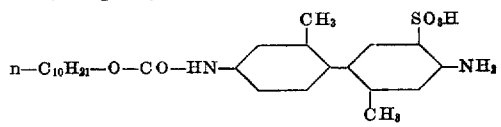

are indirectly diazotized as described in Example 1. The suspension of the yellowish diazo compound is mixed with a weakly acetic acid solution of 23.9 parts of 2-amino-8-hydroxynaphthalene-6-sulfonic acid. Coupling begins immediately and is completed in the course of 3 to 4 hours by dropping in an aqueous solution of 40 parts of crystallized sodium acetate.

The monoazo dyestuff so formed is completely precipitated by the addition of common salt and then filtered off. On drying it is obtained as a red powder which dissolves readily in warm water with a bright red coloration. The solution of the dyestuff is concentrated sulfuric acid is blue in daylight, but red-violet in incident artificial light. From neutral to weakly acetic acid baths the dyestuff dyes wool, silk and polyamide fibers in bright red shades of very good light fastness and very good fastness to washing, perspiration and milling.

A suitable dyeing procedure is as follows:

100 parts of a wool fabric are entered into a dyebath at 40° which is composed of 5000 parts of water, 10 parts of anhydrous sodium sulfate and 1 part of dyestuff. The bath is heated to 100° in 15 minutes and maintained at this temperature for 30 minutes. Then 20 parts of a 10% aqueous acetic acid solution are added and dyeing continued at 100° for a further 30 minutes. During the dyeing process the evaporated water is constantly replaced. The wool, dyed to a red shade, is removed, rinsed with water and dried.

EXAMPLE 3

33.3 parts of 2,2'-dichloro-4,4'-diamino-1,1'-diphenyl-5-sulfonic acid are dissolved in 400 parts of water and 50 parts of 2/n sodium hydroxide solution. 10 parts of sodium bicarbonate are added to the solution, then in the course of the next 3 to 4 hours 20–22 parts of chloroformic acid n-octyl ester are dropped in with vigorous stirring until the starting material is no longer indicated. To the resultant solution of the monocarbo-octyloxyamino derivative are added 7 parts of sodium nitrite, and it is then allowed to run slowly into a mixture of 40 parts of concentrated hydrochloric acid and 200 parts of water which is maintained at 5–10°. The yellow precipitated diazo compound is filtered off and dispersed in 200 parts of ice-water, to which is added a solution of 36 parts of 2-(2',4',6'-trimethyl)-phenylamino-8-hydroxynaphthalene-6-sulfonic acid in 200 parts of water showing a weakly acid reaction on Congo red indicator paper. In the course of the next 4 to 5 hours a solution of 30 parts of crystallized sodium acetate in 200 parts of water is added dropwise to the coupling mass. On completion of coupling the precipitated monoazo dyestuff is filtered off, washed with a 2% solution of common salt, and dried. It is a dark red powder which dissolves in warm water and in concentrated sulfuric acid with a violet-red coloration. Applied from neutral or weakly acetic acid baths to wool or polyamide fibers, it yields red-violet shades of very good fastness to light and excellent fastness to wet treatments.

Further acid monoazo dyestuffs which are obtainable by procedures the same as or similar to those of Examples 1 to 3 are set out in the following table. They correspond to the general Formula I and are characterized by the symbols $x$, $y$, $R_1$, $R_2$ and $R_3$, the positions of $x$ and $y$ in the diphenyl radical, and the shades of their dyeings on wool.

Table

| Ex. No. | $x$ | Positions | $y$ | Positions | $R_1$ | $R_2$ | $R_3$ | Shade of the dyeing on wool |
|---|---|---|---|---|---|---|---|---|
| 4 | H | | H | | Methyl | N-methyl-N-phenylamino | Hydrogen | Red. |
| 5 | Cl | 2,2' | H | | do | do | do | Do. |
| 6 | Cl | 2,2' | H | | do | Hydroxy | 2'-methylphenyl | Bluish red. |
| 7 | H | | H | | n-Pentyl | do | do | Do. |
| 8 | Cl | 2,2' | H | | do | do | do | Do. |
| 9 | CH₃ | 2,2' | H | | do | do | do | Do. |
| 10 | CH₃ | 2,2' | H | | n-Heptyl | do | 2'-methoxyphenyl | Do. |
| 11 | Cl | 2,2' | H | | do | do | do | Do. |
| 12 | CH₃ | 2,2' | H | | n-Nonyl | Methylamino | Hydrogen | Red. |
| 13 | CH₃ | 2,2' | H | | do | Hydroxy | 2',4'-dimethylphenyl | Bluish red. |
| 14 | Cl | 2,2' | H | | Phenyl | do | do | Do. |
| 15 | CH₃ | 2,2' | H | | 4-tert. butylphenyl | do | do | Do. |
| 16 | Cl | 2,2' | H | | Cyclohexyl | do | 2',5'-dimethylphenyl | Do. |
| 17 | CH₃ | 2,2' | H | | do | do | do | Do. |
| 18 | CH₃ | 2,2' | H | | n-Butoxy | Methylamino | Hydrogen | Red. |
| 19 | CH₃ | 2,2' | H | | do | Hydroxy | 2',6'-dimethylphenyl | Bluish Red. |
| 20 | CH₃ | 2,2' | H | | n-Octyloxy | do | do | Do. |
| 21 | Cl | 2,2' | H | | do | do | do | Do. |
| 22 | H | | H | | do | do | do | Do. |
| 23 | CH₃ | 2,2' | H | | n-Dodecyloxy | do | Hydrogen | Red. |
| 24 | Cl | 2,2' | H | | Cyclohexyloxy | do | 2',4',6'-trimethylphenyl | Bluish red. |
| 25 | CH₃ | 2,2' | H | | do | do | do | Do. |
| 26 | CH₃ | 2,2' | H | | Ethoxy-ethoxy | do | do | Do. |
| 27 | CH₃ | 2,2' | H | | do | N-ethyl-N-phenylamino | Hydrogen | Red. |
| 28 | CH₃ | 2,2' | H | | n-Butoxy-ethoxy | do | do | Do. |
| 29 | Cl | 2,2' | H | | do | N-hydroxyethyl-N-phenylamino | do | Do. |
| 30 | Cl | 2,2' | H | | n-Hexyloxyethoxy | do | do | Do. |
| 31 | CH₃ | 2,2' | H | | do | Hydroxy | do | Do. |
| 32 | CH₃ | 2,2' | H | | do | do | 2',6'-dimethylphenyl | Bluish red. |
| 33 | H | | H | | Phenoxy-ethoxy | Ethylamino | Hydrogen | Red. |
| 34 | CH₃ | 2,2' | H | | do | do | do | Do. |
| 35 | Cl | 2,2' | H | | do | Hydroxy | do | Do. |
| 36 | CH₃ | 2,2' | H | | Methoxy-ethoxy-ethoxy | Phenylamino | do | Do. |
| 37 | Cl | 2,2' | H | | do | do | do | Do. |
| 38 | H | | H | | do | Methylamino | do | Do. |
| 39 | H | | H | | n-Butoxy-ethoxy-ethoxy | do | do | Do. |
| 40 | CH₃ | 2,2' | H | | do | (2-hydroxy)-ethylamino | do | Do. |
| 41 | CH₃ | 3,3' | H | | 3-methoxybutoxy | Dimethylamino | do | Do. |
| 42 | CH₃ | 2,2' | H | | 4-methyl-cyclohexyloxy | Di-(2-hydroxyethyl)-amino | do | Do. |
| 43 | CH₃O | 2,2' | H | | 4-chlorophenyl | 3-hydroxypropylamino | do | Do. |
| 44 | CH₃O | 3,3' | H | | Benzyl | 2-ethoxyethylamino | do | Do. |
| 45 | CF₃ | 2,2' | H | | 4-methylphenyl | do | do | Do. |
| 46 | CF₃ | 2,2' | H | | Isobutyl | 3-methoxypropylamino | do | Do. |
| 47 | CH₃-SO₂ | 2,2' | H | | n-Propoxy | Phenylamino | do | Do. |
| 48 | CH₃-SO₂ | 2,2' | H | | Ethoxy | 4-methylphenylamino | do | Do. |
| 49 | CH₃ | 3,3' | CH₃ | 6,6' | Nonyloxy | 2-hydroxyethylamino | 2',4',6'-trimethylphenyl | Do. |
| 50 | CH₃ | 3,3' | CH₃ | 6,6' | 2-ethylhexyloxy | Hydroxy | 2'-chlorophenyl | Bluish red. |
| 51 | CH₃ | 3,3' | CH₃ | 6,6' | Ethyl | do | 2',6'-diethylphenyl | Do. |
| 52 | CH₃ | 2,2' | H | | Morpholinoethoxy | do | 2',3',4',6'-tetramethylphenyl | Do. |
| 53 | CH₃ | 2,2' | H | | Tetrahydrofurfuryloxy | do | do | Do. |
| 54 | CH₃ | 2,2' | H | | Phenoxymethyl | do | 2'-ethyl-4',6'-dimethylphenyl | Do. |
| 55 | CH₃ | 2,2' | H | | Propyl | do | do | Do. |
| 56 | CH₃ | 2,2' | H | | Butyl | do | 2',4',6'-triethylphenyl | Do. |
| 57 | Cl | 2,2' | H | | (2,4-dichloro)-phenoxymethyl | do | Hydrogen | Red. |
| 58 | H | | H | | 2',4-dichlorophenyl | do | do | Do. |
| 59 | CH₃ | 3,3' | CH₃ | 6,6' | Isoamyloxy | do | 2',4',6'-trimethylphenyl | Bluish red. |
| 60 | Cl | 3,3' | H | | Ethoxy | Dimethylamino | Hydrogen | Red. |
| 61 | CH₃O | 2,2' | H | | Isobutyl | Diethylamino | do | Do. |
| 62 | CH₃ | 2,2' | H | | Undecyl | Hydroxy | do | Do. |
| 63 | CH₃ | 2,2' | H | | 2,4,5-trichlorophenyl | Amino | do | Do. |
| 64 | CH₃ | 2,2' | H | | Hexyloxy | do | do | Do. |
| 65 | H | | H | | Isobutoxy | do | do | Do. |
| 66 | H | | H | | (4-chloro)-phenoxymethyl | Hydroxy | 2'-chlorophenyl | Bluish red. |
| 67 | Cl | 2,2' | H | | n-Decyloxy | Morpholino | Hydrogen | Red. |
| 68 | CH₃ | 2,2' | H | | do | 4-methoxyphenylamino | do | Do. |
| 69 | CH₃ | 2,2' | H | | 3-chlorophenyl | 3-chlorophenylamino | do | Do. |
| 70 | H | | H | | Chloromethyl | Phenylamino | do | Do. |
| 71 | H | | H | | 1-chloroethyl | Hydroxy | 2'-ethylphenyl | Bluish red. |
| 72 | CF₃ | 2,2' | H | | 2-chloroethoxy | do | 2'-methoxy-5'-methylphenyl | Do. |
| 73 | CH₃SO₂ | 2,2' | H | | Amyloxy | do | 2',6'-diethylphenyl | Do. |
| 74 | CH₃ | 2,2' | H | | n-Decyloxy | n-Propylamino | Hydrogen | Red. |
| 75 | CH₃ | 2,2' | H | | Benzyloxy | Hydroxy | 2',6'-dimethylphenyl | Bluish red. |
| 76 | CH₃ | 2,2' | H | | 2-phenylethoxy | do | Hydrogen | Red. |
| 77 | CH₃ | 2,2' | H | | 1-phenylethoxy | do | do | Do. |
| 78 | CH₃ | 2,2' | H | | Methoxymethyl | Benzylamino | do | Do. |
| 79 | H | | H | | Ethoxymethyl | Cyclohexylamino | do | Do. |
| 80 | H | | H | | 2-ethoxyethyl | 4-methylcyclohexylamino | do | Do. |
| 81 | CH₃ | 3,3' | H | | 2-butoxyethyl | Isoamylamino | do | Do. |
| 82 | Cl | 2,2' | H | | 3-methoxypropyl | Hydroxybutylamino | do | Do. |
| 83 | CH₃ | 3,3' | CH₃ | 6,6' | 3-methoxybutyl | 4-chlorophenylamino | do | Do. |
| 84 | CF₃ | 2,2' | H | | 4-methylcyclohexyl | Amino | do | Do. |
| 85 | CH₃ | 2,2' | H | | 4-pyridyl | do | do | Do. |
| 86 | H | | H | | 3-pyridyl | Hydroxy | 2',4',6'-trimethylphenyl | Bluish red. |

EXAMPLE 87

58.4 parts of the monoazo dyestuff obtained by acetic acid coupling of the diazo compound of 4-amino-4′-acetylamino - 2,2′ - dimethyl - 1,1′ - diphenyl - 5 - sulfonic acid with 2-amino-8-hydroxynaphthalene-6-sulfonic acid are dissolved at 80–90° in 800 parts of a 3% sodium hydroxide solution and maintained at this temperature until the acetyl group is split off. On cooling the solution is weakly acidified and the precipitated dyestuff is filtered off.

The dyestuff paste thus obtained is dissolved in 1000 parts of water and 20 parts of sodium bicarbonate at 20–25° and 22.5 parts of chloroformic acid decyl ester are added dropwise in the course of 3–4 hours to the well stirred solution. After several hours' continued stirring the dyestuff is precipitated with common salt, filtered off and dried. It is identical with the dyestuff of Example 2.

With poorly soluble dyestuffs the acetyl group is saponified preferably in the presence of a water-soluble solvent like pyridine or ethyl alcohol.

Formulae of representative dyestuffs of the foregoing examples are as follows:

EXAMPLE 1

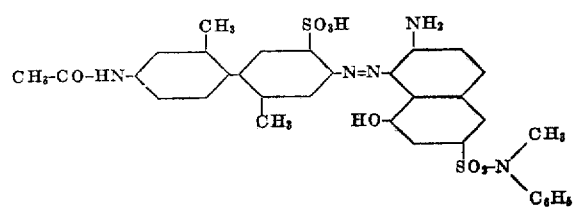

EXAMPLE 2

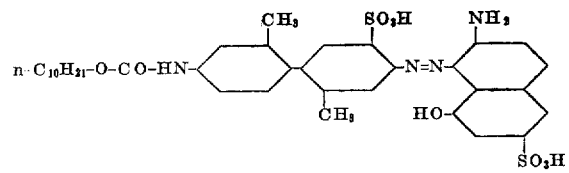

EXAMPLE 3

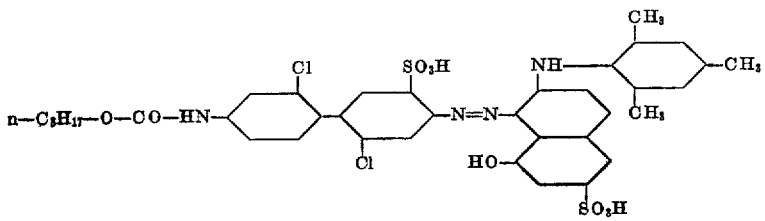

EXAMPLE 27

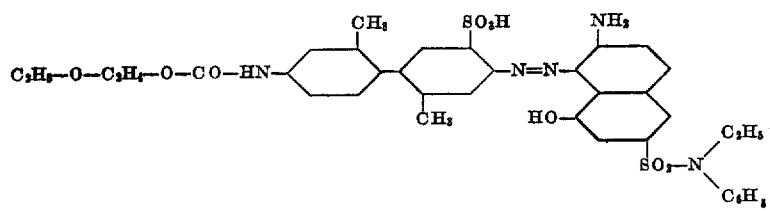

EXAMPLE 32

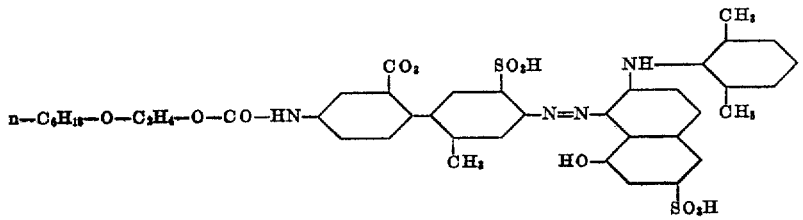

EXAMPLE 34

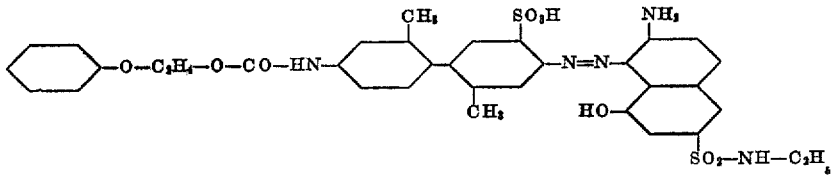

Having thus disclosed the invention what is claimed is:

1. An acid monoazo dyestuff which has a molecular weight greater than 600 and corresponds to the formula

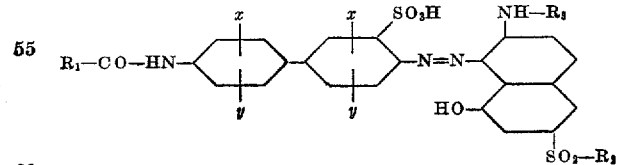

wherein each of $x$ and $y$ stands for a member selected from the group consisting of a hydrogen atom, a chlorine atom, a methyl group, a methoxy group, a trifluoromethyl group and a methylsulfonyl group, $R_1$ stands for a member selected from the group consisting of an alkyl group, a halogenated alkyl group, an alkoxyalkyl group, an alkoxy group, an alkoxyalkoxy group, an alkoxyalkoxyalkoxy group, a phenoxyalkoxy group, a cycloalkyl group, a cycloalkoxy group, an aralkyl group of the benzene series, an aralkoxy group of the benzene series, an aryl group of the benzene series, an alkoxyaryl group of the benzene series, a chlorinated aryl group of the benzene series, a pyridyl group, a morpholinoethoxy and a tetrahydrofurfuryloxy group, $R_2$ stands for a member selected from the group consisting of a hydroxy group and a primary, secondary and tertiary amino group, and $R_3$ stands for a member selected from the group consisting of a hydrogen atom and a phenyl radical carrying at least in one of its orthopositions a member selected from the group consisting of lower alkyl and lower alkoxy groups and a chlorine atom, when $R_2$ represents a hydroxy group, and only a hydrogen atom, when $R_2$ has another meaning.

2. A monoazo dyestuff which corresponds to the formula

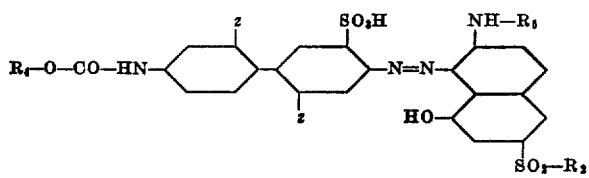

wherein z stands for a member selected from the group consisting of a chlorine atom and a methyl group, $R_2$ stands for a member selected from the group consisting of a hydroxy group and a primary, secondary and tertiary amino group, $R_4$ stands for a member selected from the group consisting of an alkyl radical containing 6 to 18 carbon atoms, an alkoxyethyl radical and a phenoxyethyl radical, $R_5$ stands for a member selected from the group consisting of a hydrogen atom, a 2',6'-dimethylphenyl radical and a 2',4',6'-trimethylphenyl radical, when $R_2$ represents a hydroxy group and stands only for a hydrogen atom, when $R_2$ has another meaning.

3. The acid monoazo dyestuff which corresponds to the formula

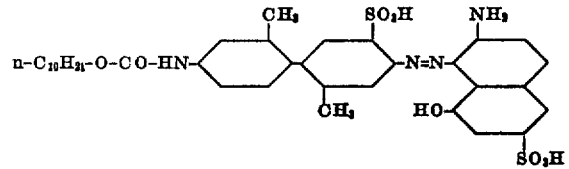

4. The acid monoazo dyestuff which corresponds to the formula

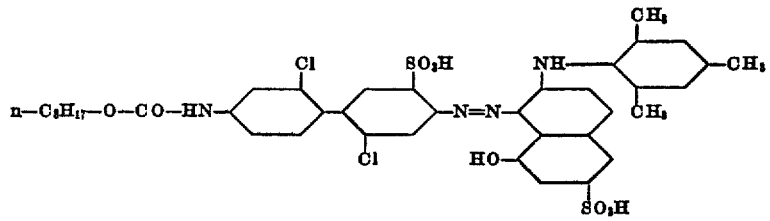

5. The acid monoazo dyestuff which corresponds to the formula

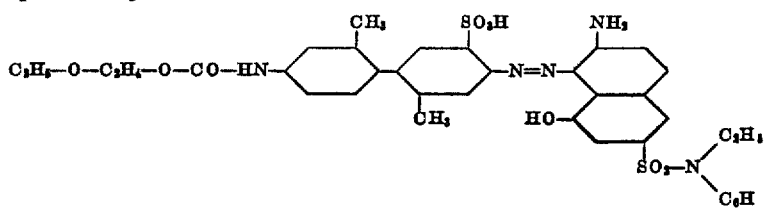

6. The acid monoazo dyestuff which corresponds to the formula

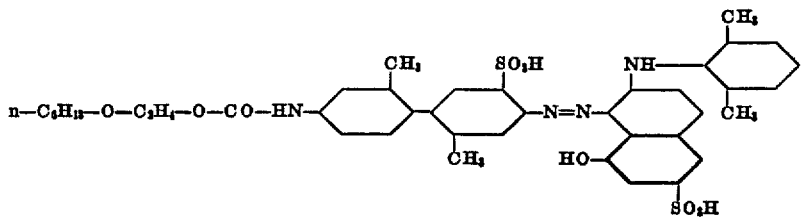

7. The acid monoazo dyestuff which corresponds to the formula

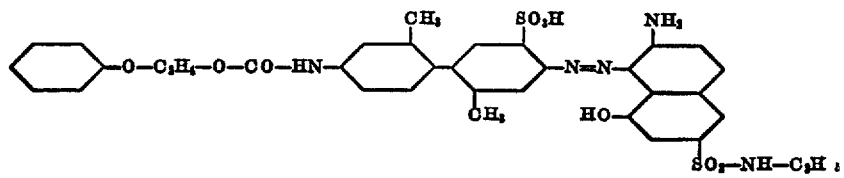

References Cited in the file of this patent
UNITED STATES PATENTS

| | | |
|---|---|---|
| 1,201,544 | Bergdolt | Oct. 17, 1916 |
| 2,374,157 | Kvalnes | Apr. 17, 1945 |
| 2,831,850 | Merian et al. | Apr. 22, 1958 |

UNITED STATES PATENT OFFICE
Certificate of Correction

Patent No. 2,904,543                                                        September 15, 1959

Markus Kappeler et al.

It is hereby certified that error appears in the printed specification of the above numbered patent requiring correction and that the said Letters Patent should read as corrected below.

Column 4, line 34, for "is concentrated" read —in concentrated—; column 7, line 55, for "3-" read —3-4—; column 8, Example 32, the extreme left-hand portion of the formula should appear as shown below instead of as in the patent:

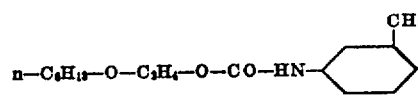

column 10, claim 5, the lower right-hand portion of the formula should appear as shown below instead of as in the patent:

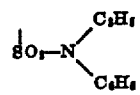

same column 10, claim 7, the lower right-hand portion of the formula should appear as shown below instead of as in the patent:

Signed and sealed this 24th day of May 1960.

[SEAL]

Attest:
KARL H. AXLINE,
*Attesting Officer.*

ROBERT C. WATSON,
*Commissioner of Patents.*